US008386376B2

(12) United States Patent
Gomes et al.

(10) Patent No.: US 8,386,376 B2
(45) Date of Patent: Feb. 26, 2013

(54) SYSTEM AND METHOD USING ENHANCED AUTHORIZATION DATA TO REDUCE TRAVEL-RELATED TRANSACTION FRAUD

(75) Inventors: Kristin Hoyne Gomes, State College, PA (US); Stuart Goulden, Wharton, NJ (US); Vernon Marshall, Montclair, NJ (US); Sabyasachi Mohanty, Orissa (IN); Ian Webb, Darien, CT (US)

(73) Assignee: American Express Travel Related Services Company, Inc., New York, NY (US)

( * ) Notice: Subject to any disclaimer, the term of this patent is extended or adjusted under 35 U.S.C. 154(b) by 488 days.

(21) Appl. No.: 10/588,811

(22) PCT Filed: Feb. 9, 2005

(86) PCT No.: PCT/US2005/004135
§ 371 (c)(1),
(2), (4) Date: Jun. 11, 2007

(87) PCT Pub. No.: WO2005/077066
PCT Pub. Date: Aug. 25, 2005

(65) Prior Publication Data
US 2007/0282674 A1 Dec. 6, 2007

Related U.S. Application Data

(60) Provisional application No. 60/543,044, filed on Feb. 9, 2004.

(51) Int. Cl.
*G06Q 40/00* (2012.01)
(52) U.S. Cl. ............ 705/38; 705/5; 705/39; 235/492
(58) Field of Classification Search ............... 705/1, 35, 705/5, 6, 8, 14, 37–39
See application file for complete search history.

(56) References Cited

U.S. PATENT DOCUMENTS

| 6,023,679 | A | * | 2/2000 | Acebo et al. | 705/5 |
| 6,029,154 | A | | 2/2000 | Pettitt | |
| 6,658,393 | B1 | * | 12/2003 | Basch et al. | 705/38 |
| 6,926,203 | B1 | * | 8/2005 | Sehr | 235/492 |
| 6,999,943 | B1 | * | 2/2006 | Johnson et al. | 705/39 |
| 7,136,835 | B1 | | 11/2006 | Flitcroft et al. | |
| 7,640,185 | B1 | | 12/2009 | Giordano | |
| 2002/0091554 | A1 | * | 7/2002 | Burrows | 705/5 |
| 2003/0105707 | A1 | | 6/2003 | Audebert et al. | |
| 2003/0167226 | A1 | | 9/2003 | Britton et al. | |

(Continued)

OTHER PUBLICATIONS

International Search Report for International Application No. PCT/US2005/04135 mailed on Feb. 28, 2006, 5 pages.

(Continued)

*Primary Examiner* — Charles Kyle
*Assistant Examiner* — Siegfried E Chencinski
(74) *Attorney, Agent, or Firm* — Snell & Wilmer L.L.P.

(57) ABSTRACT

Processes for reducing fraud risk in credit transactions, particularly those involving airline ticket purchases, include collecting the following additional transaction variables and their use in real-time authorization decisions: credit card holder name, reservation code, passenger name, origin city, destination city, travel date, routing description, class of service, e-ticket indicator, number of passengers traveling and carrier code. The additional transaction variables received during a transaction involving the purchase of airline tickets are passed, in addition to the transaction variables traditionally included in a real-time authorizations request, to a fraud risk evaluation model maintained by a financial institution or other entity responsible for authorizing a payment for the transaction. The fraud-risk models use historical behavior and optimal risk decision-making factors to authorize or reject the transaction in real time, without slowing standard authorization processing times.

25 Claims, 4 Drawing Sheets

U.S. PATENT DOCUMENTS

2003/0225687 A1* 12/2003 Lawrence .................... 705/38

OTHER PUBLICATIONS

USPTO; Office Action dated Oct. 7, 2008 in U.S. Appl. No. 11/303,018.
USPTO; Final Office Action dated Apr. 29, 2009 in U.S. Appl. No. 11/303,018.
USPTO; Office Action dated Sep. 23, 2009 in U.S. Appl. No. 11/303,018.
USPTO; Final Office Action dated Jan. 21, 2010 in U.S. Appl. No. 11/303,018.
USPTO; Advisory Action dated Apr. 23, 2010 in U.S. Appl. No. 11/303,018.
USPTO; Office Action dated Jun. 21, 2010 in U.S. Appl. No. 11/303,018.
USPTO; Final Office Action dated Dec. 8, 2010 in U.S. Appl. No. 11/303,018.
USPTO; Office Action dated Apr. 12, 2011 in U.S. Appl. No. 11/303,018.
USPTO; Advisory Action dated Mar. 2, 2011 in U.S. Appl. No. 11/303,018.
PCT; International Preliminary Report on Patentability dated Sep. 25, 2006 in Application No. PCT/US2005/004135.
USPTO; Final Office Action dated Oct. 24, 2011 in U.S. Appl. No. 11/303,018.
USPTO; Advisory Action dated Dec. 2, 2011 in U.S. Appl. No. 11/303,018.
Office Action dated May 4, 2012 in U.S. Appl. No. 11/303,018.

* cited by examiner ered herein # SYSTEM AND METHOD USING ENHANCED AUTHORIZATION DATA TO REDUCE TRAVEL-RELATED TRANSACTION FRAUD

CROSS-REFERENCE TO RELATED APPLICATIONS

This application is a U.S. national phase filing under 35 U.S.C. §371 of PCT/US2005/004135 filed Feb. 9, 2005 and entitled "SYSTEM AND METHOD USING ENHANCED AUTHORIZATION DATA TO REDUCE TRAVEL-RELATED TRANSACTION FRAUD", which application claims priority to and the benefit of U.S. Provisional Application No. 60/543,044, filed on Feb. 9, 2004 and entitled "ENHANCED AIRLINE AUTHORIZATION DATA FOR FRAUD CONTROL", both of which are incorporated herein by reference.

TECHNICAL FIELD

This disclosure generally relates to use of additional data in real-time authorization of financial transactions, and in particular it relates to reducing fraud in airline ticket purchasing transactions.

BACKGROUND OF THE DISCLOSURE

Fraudulent airline ticket purchases have occurred on all types of credit and charge card products and other payment vehicles since they were introduced in the industry as a form of payment. Unscrupulous individuals frequently utilize charge or credit cards belonging to other parties to make unauthorized purchases of airline tickets and services. These individuals cause substantial harm to merchants (such as airlines, travel agencies and online travel web sites) in the form of increased costs, because merchants are generally "charged back" for the cost of the ticket by the card issuer. Merchants are also harmed through loss of revenue since controls introduced to eliminate fraudulent transactions also cause some legitimate transactions to be refused. In addition, fraud generates additional operations costs related to processing charge backs and generates security risks by having these individuals utilizing airline services. Affected card members and other types of account holders are harmed since they must deal with the discomfort of realizing their cards or financial accounts were compromised, and must have their affected cards reissued. Financial institutions are harmed by the behavior of these individuals due in part to costs of processing charge backs, and also since they may be ultimately responsible for any fraudulent charges where proper merchant card acceptance procedures were followed. The occurrence of fraud on airline transactions also has negative impacts on the brand reputations of both the card and airline industries.

In order to combat this type of fraud, credit and charge card companies (collectively, card issuers) and other types of financial institutions (such as banks providing debit cards to account holders) have performed risk screening for all financial transactions in two general manners: (1) "real-time authorization" in which an authorization request is sent real time to the card issuer and only the specific behaviors of the card member and the merchant involved in a transaction are examined; and (2) "offline authorization" in which risky patterns are identified in a transaction after its completion, and an affected card member or account holder is contacted to verify a purchase. However, these measurements, while reducing the incidence of fraudulent transactions, leave in place a substantial residual level of fraud in the industry.

Currently, the transaction data provided by merchants to financial institutions for real-time authorization include only the purchase amount, vendor identification, credit card account number, credit card expiration date, and transaction date. Due to this limited data, a financial institution has limited modeling capabilities to protect themselves and airline vendors from fraudulent activity. Additional data is provided in the subsequent submission to the issuer however the delay between authorization and submission limits the ability of financial institutions to use this additional data to make optimized risk decisions in any given transaction.

Accordingly, there is a need for introducing fraud control measures in financial transaction processes that address the above-described problems with respect to timeliness of data availability and the shortcomings in existing and related technologies.

SUMMARY OF THE DISCLOSURE

The present disclosure, therefore, introduces a system for increasing the number of data variables made available for, and used in, real-time processing of transactions involving airline ticket purchases to reduce the incidence of fraud and costs related thereto. In various embodiments, merchants transmit certain additional transaction variables for travel ticket transactions to a financial institution as part of a request for real-time authorization of such transactions. In the case of a purchase of an airline ticket, the additional transaction variables include one or more of the name of the account holder, an airline reservation code associated with the airline ticket, a passenger name on the airline ticket, an origin city or airport, a destination city or airport, a travel date, a description of routing airports or city codes of the airline ticket, a class of service of the airline ticket, an electronic ticket indicator, a number of passengers traveling and an airline carrier code. Similar transaction variables may be collected for other types of purchases.

The financial institution processes the received transaction variables through a fraud-risk model to determine a risk factor for the transaction, and generates a real-time decision to approve or refer the transaction for further identification based on the output of the fraud-risk model. The fraud-risk model includes a plurality of risk values that are applied to the transaction variables or comparisons between received transaction variables. The risk values are determined, and may be periodically updated, based on historical data of prior financial transactions and fraudulent purchases.

The fraud-risk model is applied after receiving a request from a merchant for real-time authorization of a transaction involving a purchase of an airline ticket by an account holder. In response to the request, an authorization decision based on the risk factor for the transaction is transmitted to the merchant within a few seconds of the request being made. The authorization decision may be based on presently-used authorization decision-making criteria in addition to the additional data described in this document. In addition, the fraud-risk model operates in such manner that the time to authorize a transaction having the additional transaction variables is not increased relative to the standard authorization times of other types of financial transactions involving similar payment vehicles.

BRIEF DESCRIPTION OF THE DRAWINGS

Further aspects of the present disclosure will be more readily appreciated upon review of the detailed description of its various embodiments, described below, when taken in conjunction with the accompanying drawings, of which.

DETAILED DESCRIPTION OF THE SPECIFIC EMBODIMENTS

Figure 1:
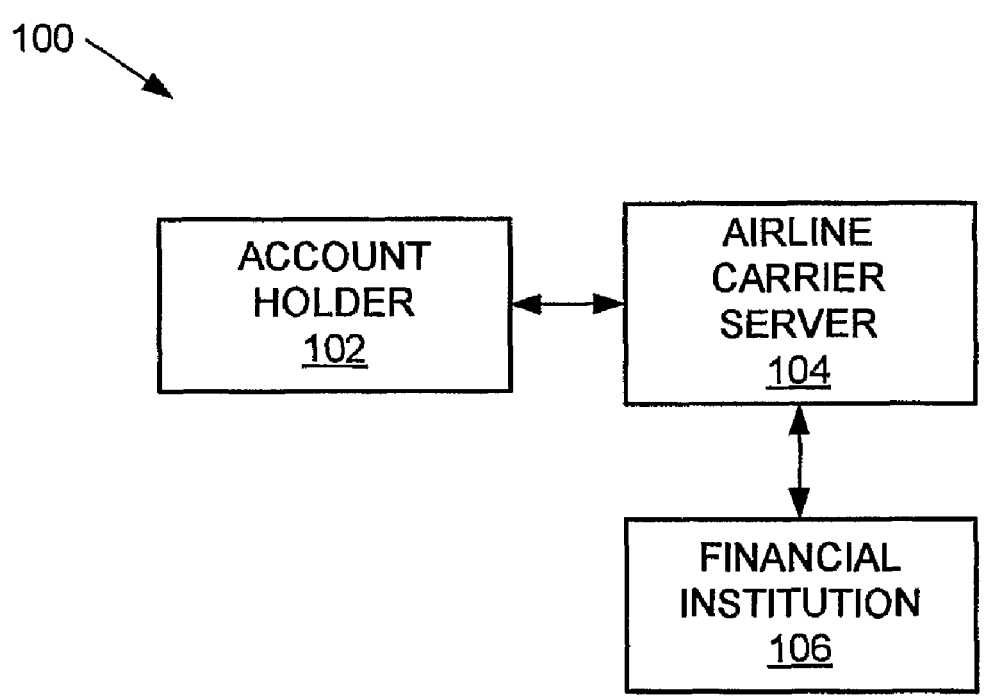
FIG. 1 is a block diagram of a first exemplary financial transaction network for processing financial transactions according to the present disclosure.

Financial institutions currently have existing transaction networks over which financial transactions between its account holders and various merchants may be completed. Financial institutions are therefore uniquely positioned to offer advanced risk identification and prevention measures to its customers, merchants and partners by leveraging these existing networks, or by establishing new networks where these capabilities are provided.

The processes introduced herein enable financial institutions to make improved fraud risk management decisions for transactions, particularly those involving travel tickets such as airline tickets. By capturing and analyzing certain additional information at the point of authorization of a charge, the risk that the transaction is fraudulent may be more accurately evaluated before the ticket purchase is authorized. In an embodiment, real-time fraud risk decisions are based on an evaluation of the data traditionally provided in an authorization request plus eleven additional transaction variables that have routinely been captured by the merchant and are now transmitted to the financial institution with a real-time authorization request.

The processes will be described throughout with reference to airline tickets. However, it should be readily apparent that the processes may be used regarding any transaction in which similar data may be captured and evaluated. In an embodiment, the additional transaction variables provided with respect to the purchase of airline tickets may include: a card member/account holder who is using a financial account associated with a payment vehicle to pay for the ticket; an airline reservation code for the ticket; the passenger name listed on the ticket; an origin airport for the ticket; a destination airport for the ticket; a travel date for the ticket; a description of routing airports or city codes of the airline ticket (e.g., New York to Miami returning to New York: JFK-MIA-JFK); a class of service (e.g., first class, business class, or coach class, including fare basis information and ticket designator information); an indicator of whether the airline ticket is an electronic ticket; a number of passengers for which tickets are purchased; and a code corresponding to an airline carrier for which the ticket is booked.

Advantageously, these eleven variables are typically captured in various transactions by airlines and other airline ticket merchants, such as travel agencies and online travel web sites. However, these transaction variables have not previously been provided as part of real-time authorization requests to financial institutions that maintain account holder accounts, and such transaction variables have not been used for fraud risk screening by financial institutions prior to or during the real-time authorization of a transaction.

According to the present disclosure then, one or more of the additional transaction variables are now transmitted from the merchant to a financial institution in an automated manner and in a standardized format over the financial transaction network during a transaction initiation and authorization process so that standard authorization times (based on all types of financial transactions using similar payment vehicles) are not affected. The received transaction variables (traditional plus additional) are immediately presented to one or more software-implemented fraud-risk models maintained by the financial institution, which then evaluates the received transaction variables. From this, an immediate risk decision (i.e., to accept or refer the transaction for further identification, or a request to contact the financial institution) based on a determined risk factor can be made.

In various embodiments, the transaction variables may be used in combination with standard information utilized by financial institutions to authorize transactions (e.g., amount of transaction, status of account holder account, purchases and transaction history of the particular account holder, available credit for the financial account, and a transaction history of the particular merchant). The combination of the processes introduced herein with standard authorization decision-making criteria will provide enhanced fraud risk assessment before the ticket or service is authorized for payment on a payment vehicle. This, in turn, will reduce the incidence of fraudulent transactions and reduce processing costs for charge backs and the like.

Turning now to FIG. 1, there is depicted a conceptual block diagram of a first exemplary transaction network 100, over which the processes of the present disclosure may be performed. In the network 100, an account holder 102 may initiate a transaction with an airline carrier server 104 for the purchase of airline tickets in any standard manner. When the account holder wishes to pay for the tickets using a payment vehicle, the airline carrier server 104, in turn, may communicate with a financial institution server 106 of the financial institution that maintains the account corresponding to the payment vehicle.

In various embodiments, the account holder 102 may communicate with the airline carrier over the Internet using a computer terminal or the like, via telephone, or in person. The account holder 102 may use a credit card, charge card, stored value card, debit card or other type of payment vehicle for the transaction.

The airline carrier server 104 may be any type of computer server, or group of distributed servers, that include appropriate processors, memory and network communication devices, as well as application and operating systems software that includes processing instructions and programming for performing the processes disclosed herein. The airline carrier server 104 may communicate with the financial server 106 using any existing transaction processing network, with little need for changes to existing network hardware. Merchants and financial institutions may require certain software changes to capture and transmit the eleven transaction variables with authorization requests for ticket purchases in an acceptable format. When the transaction involves an AMERICAN EXPRESS card, for example, the transaction variables can be sent in the AMERICAN EXPRESS Authorization ISO 8583 Version 1 Specification format.

Figure 2:
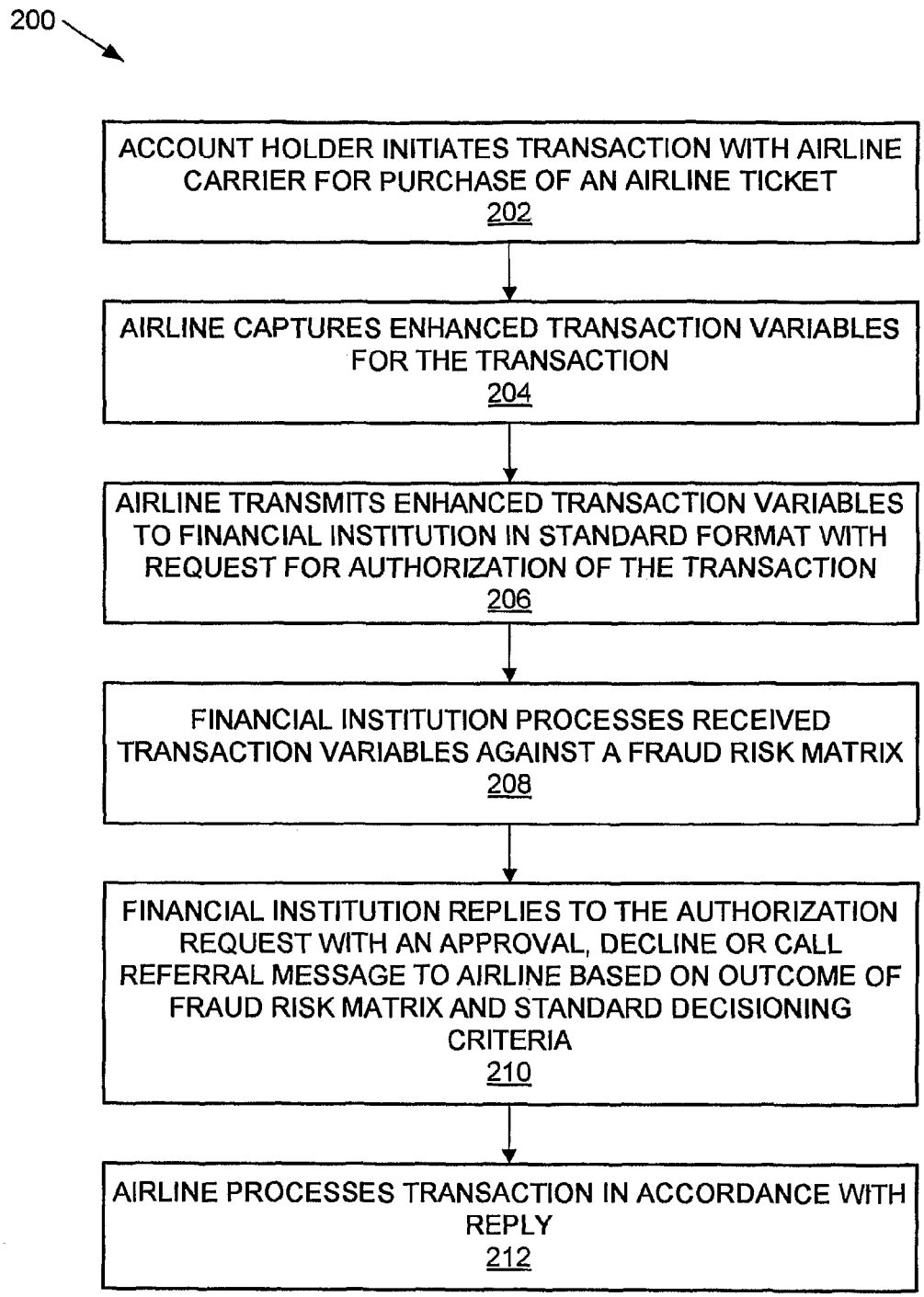
FIG. 2 is a flowchart illustrating a first exemplary method for processing a financial transaction involving the purchase of airline tickets using enhanced transaction variables according to the present disclosure.

Turning now to FIG. 2, there is depicted a flowchart of an exemplary method 200 for processing a financial transaction involving the purchase of airline tickets using enhanced transaction variables. The method 200 commences when an account holder initiates a transaction with an airline carrier for a purchase of an airline ticket (step 202). During the course of the transaction, the airline receives certain of the transaction variable information from the account holder, including the account holder name; a passenger name; an origin airport for the ticket; a destination airport for the ticket; a travel date for the ticket; a description of routing airports or city codes of the airline ticket (e.g., New York to Miami returning to New York: JFK-MIA-JFK); a class of service (e.g., first class, business class, or coach class, including fare basis information and ticket designator information); an indicator of whether the airline ticket is an electronic ticket. During the course of the transaction, the airline may also determine a reservation code for the ticket and supply its airline carrier code (step 204).

Upon agreement of the terms of the ticket, the airline receives a method of payment from the account holder, and then contacts the financial institution maintaining the account holder's account. The airline then transmits the enhanced transaction variables, in addition to the variables traditionally provided, to the financial institution in a standard format with a request to authorize the transaction for payment (step 206).

Next, at step 208, the financial institution processes the received transaction variables through at least one fraud-risk model in order to determine the risk of fraud presented by the transaction variables using historical transaction data. Any transactions identified as high risk may be referred for further identification or in case of extreme risk declined. Such a result may occur where the risk models determine that the probability of fraud is within a range of unacceptable values. This range may be established based on historical data so that legitimate transactions are not unduly prevented by the fraud-risk models. The range may be adjusted over time as more historical data is collected and analyzed.

Alternatively, or in addition thereto, where the fraud-risk models indicate a risk factor within a certain range of unacceptable values for the transaction, the financial institution may instead transmit a request to be contacted by the account holder by telephone or the like (referred to herein as a call referral message) before the transaction can be authorized. Alternatively, when the fraud-risk models indicate that the risk is within a range of acceptable values, the transaction may then continue to be processed in a standard manner.

The financial institution replies to the authorization request with an approval, declination or call referral message based on the outcome of the fraud-risk model along with standard authorization decision-making criteria (step 210). The airline then processes the transaction in accordance with the reply received from the financial institution (step 212), after which process 200 ends.

The fraud-risk model or models may be generated from collected data regarding fraudulent and/or legitimate transactions over a large group of account holders on a national or international scale. A risk value may be determined for each collected transaction variable or for inter-comparisons between the received transaction variables, using such historical transaction data. These empirically-determined, risk values may be applied within the risk models in any of a variety of useful manners to determine an overall risk for a given transaction.

The received transaction variable data can be applied to historical data in any of a wide variety of useful ways using a wide number of formulas and other forms of risk models. Since historical financial transaction data is used to determine the risk, these values and formulas will be largely dependent on the empirical data used. The formulas may further be refined over time by examining changes in historical data patterns as time progresses, as will be readily apparent to one of ordinary skill in the art.

In one example, transactions in which a reservation code is provided may have less risk of fraud than transactions in which no reservation code is provided. The fraud-risk model may then apply a risk value to a received transaction based on whether a reservation code has been provided and the historical data on prior transactions in which a reservation code has not been received.

In another example, historical data may reveal that fraudulent transactions are more likely for tickets of a certain type of routing (i.e., one-way ticket purchases may have a greater risk of being fraudulent than round-trip purchases), a certain class of service, or for certain airline carriers. Appropriate risk values will then be applied to these individual transaction variables for each transaction received.

In a further example, a transaction is received in which the transaction variable "Passenger Name" is not the same as the transaction variable "Account Holder Name." The risk value based on such inter-comparison of received transaction variables may be determined based on data of prior fraudulent transactions. For example, it may be that the historical data shows that 5% of transactions in which the Passenger Name does not match the account holder name are fraudulent. A risk value of 0.05 for this transaction variable may accordingly be applied within the fraud-risk models for any transaction in which this is the case, and this value may be added, multiplied or combined with similar determinations for other risk values regarding the remaining transaction variables to determine an overall risk factor for the transaction.

It is important that the introduction of this fraud risk decision-making process to financial transaction authorization processes not substantially impact the standard time it currently takes to authorize a credit transaction with airlines or travel agencies, and does not unduly impact the identification and processing of legitimate transactions. That is, legitimate transactions should never be misidentified as fraudulent. Appropriate values and formulas for the risk values and the fraud-risk models, as well as range of acceptable and unacceptable values for transaction risk, may be designed with this goal in mind and refined over time by continuously analyzing historical transaction data to ensure that this goal is achieved.

Figure 3:
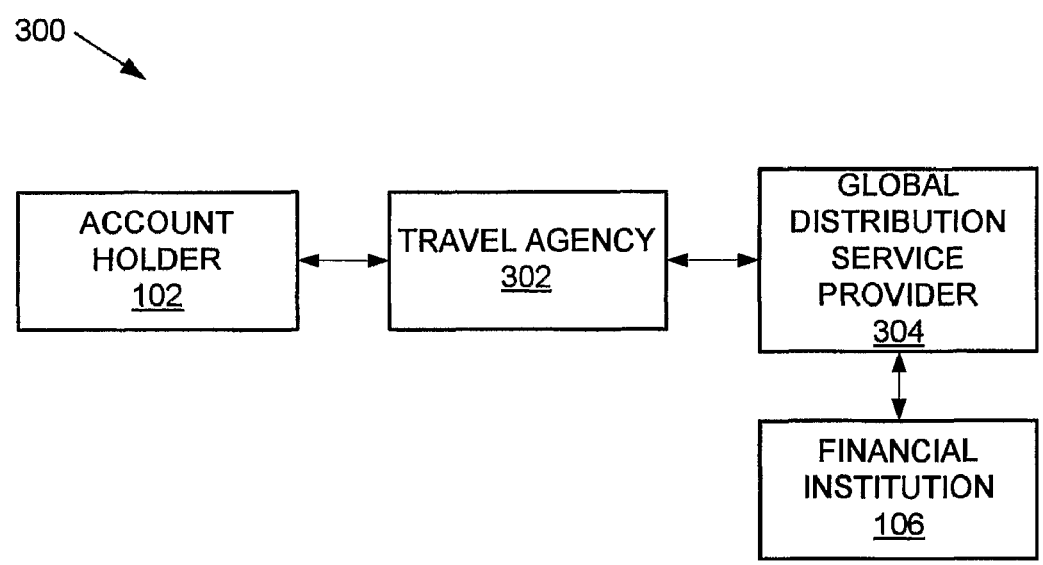
FIG. 3 is a block diagram of a second exemplary financial transaction network for processing financial transactions according to the present disclosure.

Another embodiment of the present disclosure, shown in FIG. 3, involves the case where the merchant selling the ticket is a travel agent or other third-party, and not the travel carrier engaging in a direct sale. Accordingly, a second exemplary transaction network 300 may include the account holder 102, in communication with a travel agency server 302 or other third-party merchant. The travel agency server 302, in turn, may communicate with the financial institution via a third-party processing system 304, such as may be provided by existing Global Distribution Service (GDS) providers.

In such existing systems, only minor hardware and software changes may be needed to accommodate the processes disclosed herein, so that the third-party processors can capture and transmit additional variables for fraud risk screening. In examples where the payment vehicle is maintained by AMERICAN EXPRESS, the travel agencies and Global Distribution System providers must be able to send this information to AMERICAN EXPRESS in the authorization request using the ISO 8583 Version 1 Specification format. Other third-party processors who assist in transferring authorization requests to American Express or other financial institutions (i.e., issuers of payment vehicles used for such transactions)

on behalf of airlines or GDS's must also be able to accept and transfer this information in the authorization stream as specified therein.

Figure 4:
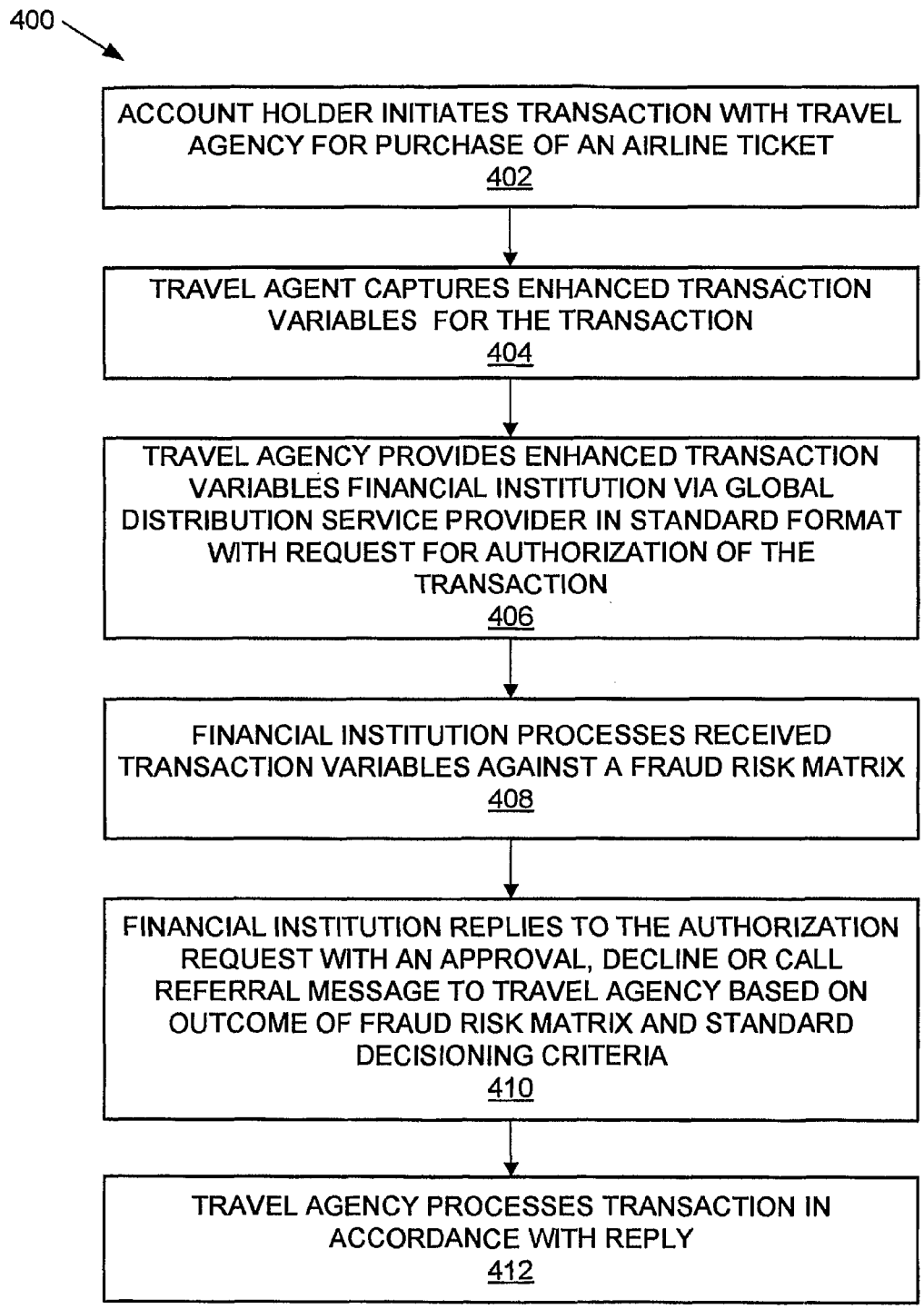
FIG. 4 is a flowchart illustrating a second exemplary method for processing a financial transaction involving the purchase of airline tickets using enhanced transaction variables according to the present disclosure.

Turning now to FIG. 4, there is depicted a flowchart of an exemplary method 400 for processing a financial transaction involving the purchase of airline tickets from a travel agency or other third-party merchant. The method 400 is similar to the method 200 described above.

The method 400 commences when an account holder initiates a transaction with the merchant for the purchase of an airline ticket (step 402). The travel agency captures the transaction variables (the variables in a traditional authorization request and the eleven listed above) for the transaction as received from the airline and the account holder (step 404) and transmits them to the financial institution—in almost all cases via the airline or a GDS—in a standard format with the request for authorization of the transaction (step 406).

The financial institution processes the received transaction variables against at least one fraud-risk model (step 408) and, in various embodiments, applies standard authorization decision-making criteria as well. The financial institution replies to the authorization request real-time with an approval, declination or call referral message based on outcome of the fraud-risk model and standard decisioning criteria (step 410). The travel agency then processes the transaction in accordance with the received reply (step 412), after which the process 400 ends.

The processes disclosed herein are projected to reduce fraud in airline ticket and similar transactions by 20% from previous levels, thus providing substantial savings to airline carriers by decreasing or eliminating charge backs for fraudulent transactions, without increasing transaction referral rates. In fact, standard referral rates can be expected to remain constant or even decrease from previous standard levels due to the improved ability to identify which transactions are fraudulent and which are legitimate.

The enhanced processes disclosed herein are an important tool that can be consistently implemented for all airline transactions in which the enhanced data (i.e., the additional transaction variables) is transmitted to a card issuer in the real-time authorizations request. Such data is already collected by airlines, travel agencies and GDS's and can be transmitted onwards to issuers with only minor adjustments to current software and without requiring the replacement of network hardware currently used in many systems.

Airlines that participate in providing this enhanced data will realize fewer fraudulent airline tickets charged back to them since the fraud models used have a higher probability of detecting and preventing fraudulent transactions than in existing systems. Airline ticket merchants will also spend less time serving fraudulent customers or investigating charge backs, resulting in reduced operational expenses. Additionally, the system makes it harder for a card holder that legitimately enters into a transaction from later claiming that the transaction was fraudulent. In this manner, the card issuer, card holder and airline vendors each benefit from the security provided by the disclosed processes.

The card issuer may secure the collected enhanced transaction data in a variety of known and effective manners so that card member information cannot be obtained or used by unauthorized third parties.

The disclosed enhancements to financial transaction processing have applicability to various types of transactions involving travel tickets (e.g., train tickets, cruise tickets, car rentals and the like) other than the specific examples involving airlines as described herein, as will be apparent to one of ordinary skill in the art. The risk values and overall ranges of acceptable risk values may be the same or different for different transaction types. The type of ticket purchased can be readily identified based on the merchant or the carrier code received with the transaction variables.

Although the best methodologies of the invention have been particularly described in the foregoing disclosure, it is to be understood that such descriptions have been provided for purposes of illustration only, and that other variations both in form and in detail can be made thereupon by those skilled in the art without departing from the spirit and scope thereof, which is defined first and foremost by the appended claims.

What is claimed is:

1. A method comprising:
   receiving, by an automated programmed electronic computer system for authorizing a transaction between a merchant and an account holder of a financial account, transaction variables for the transaction involving a purchase of a travel ticket using the financial account,;
   receiving, by the computer system, concurrently with the transaction variables, additional variables including a passenger name on the travel ticket, a travel date, a routing description of the travel ticket, and an electronic ticket indicator, wherein the additional variables are received as part of a real-time authorization process;
   processing, by the computer system, the passenger name on the travel ticket, a travel date, a routing description of the travel ticket, an electronic ticket indicator and transaction variables through a fraud risk model to determine a probability of fraud for the transaction; and
   transmitting, by the computer system, an approval of the transaction or referral of the transaction for further identification based upon the output of the fraud risk model.

2. The method of claim 1, further comprising:
   approving the transaction in response to the risk factor being within a range of acceptable values.

3. The method of claim 2, the approving further comprising:
   retrieving a purchasing history of the account holder; and
   approving the transaction based on the output of the fraud risk model and the purchasing history.

4. The method of claim 2, the approving further comprising:
   retrieving a status of the financial account; and approving the transaction based on the output of the fraud risk model and the status.

5. The method of claim 1, further comprising:
   declining the transaction when the risk factor is within a range of unacceptable values.

6. The method of claim 1, further comprising:
   transmitting a request to contact a financial institution maintaining the financial account in response to the risk factor being within a range of unacceptable values.

7. The method of claim 1, further comprising:
   retrieving a purchasing history of the account holder; and
   declining the transaction based on the purchasing history.

8. The method of claim 1, further comprising:
   retrieving a status of the financial account; and
   declining the transaction based on the status.

9. The method of claim 1, the fraud-risk model comprising a combination of risk values assigned to the transaction variables, the risk values determined from historical data of prior transactions involving a plurality of account holders.

10. The method of claim 1, the fraud-risk model comprising a combination of risk values determined for various comparisons of the transaction variables, the risk values determined from historical data of prior transactions involving a plurality of account holders.

11. The method of claim 10, wherein a risk value of a comparison of a name of the account holder and the passenger name indicates a higher risk when the name of the account holder does not match the passenger name, and indicates a lower risk when the name of the account holder matches the passenger name.

12. The method of claim 1, wherein the transaction variables are received in a standard format so that a processing time of the transaction is not greater than a standard processing time for transactions that do not involve the purchase of travel tickets.

13. The method of claim 1, the financial account comprising at least one of: a credit card account, a charge card account and a debit account.

14. The method of claim 1, the transaction variables further comprising: an origin city for the travel ticket, a destination city, a class of service of the travel ticket, and a number of passengers traveling.

15. The method of claim 1, the transaction variables comprising: a name of the account holder, a reservation code of the ticket, and a carrier code.

16. A method for authorizing a transaction between a merchant and an account holder having a financial account, the transaction involving a purchase of an airline ticket, the method comprising:
   transmitting, by an automated programmed electronic computer system for authorizing the transaction to a transaction processor, transaction variables for the transaction;
   transmitting by the computer system, concurrently with the transaction variables, additional variables including passenger name on the airline ticket, a travel date, a routing type of the airline ticket, and an electronic ticket indicator, wherein the passenger name on the travel ticket, a travel date, a routing description of the travel ticket; an electronic ticket indicator and transaction variables are processed through a fraud risk model by the transaction processor to determine a probability of fraud for the transaction, wherein the additional variables are transmitted as part of a real-time authorization process; and
   receiving, by the computer system and from the transaction processor, an approval of the transaction or referral of the transaction for further identification based upon the output of the fraud risk model.

17. The method of claim 16, wherein the transaction variables are processed by the transaction processor through a fraud-risk model comprising a combination of risk values assigned to the transaction variables, the risk values determined from historical data of prior transactions involving a plurality of account holders.

18. The method of claim 16, wherein the transaction variables are processed by the transaction processor through a fraud-risk model comprising a combination of risk values determined for various comparisons of the transaction variables, the risk values determined from historical data of prior transactions involving a plurality of account holders.

19. The method of claim 18, wherein a risk value of a comparison of the name of the account holder and the passenger name indicates a higher risk when a name of the account holder does not match the passenger name, and indicates a lower risk when the name of the account holder matches the passenger name.

20. The method of claim 16, wherein the transaction variables are transmitted in a standard format so that a processing time of the transaction is not greater than a standard processing time for transactions that do not involve the purchase of airline tickets.

21. The method of claim 16, wherein the merchant comprises at least one of:
   an online travel vendor, an airline carrier and a travel agent.

22. The method of claim 16, the transaction variables further comprising:
   an origin city for the travel ticket, a destination city, a class of service of the travel ticket, and a number of passengers traveling.

23. The method of claim 16, the transaction variables comprising: a name of the account holder, a reservation code of the ticket, and a carrier code.

24. A method comprising:
   determining, by an automated programmed electronic computer system for generating and applying a fraud-risk model to financial transactions involving purchases of airline tickets by account holders from merchants and based on historical data, a risk value for transaction variables and additional variables, the additional variables including at least one of: an account holder name, a reservation code, a passenger name, an origin city, a destination city, a travel date, a routing description, a class of service, an electronic ticket indicator, a number of passengers traveling and a carrier code;
   combining, by the computer system, the risk values to generate a fraud risk model that determines risk factors for transactions involving purchases of airline ticket;
   receiving, by the computer system, a request from a merchant to authorize a transaction involving a purchase of a ticket by an account holder, the request including transaction variables and additional variables corresponding to the account holder and the ticket, wherein the additional variables are received as part of a real-time authorization process;
   determining, by the computer system, a risk factor for the transaction by inputting the an account holder name, a reservation code, a passenger name, an origin city, a destination city, a travel date, a routing description, a class of service, an electronic ticket indicator, a number of passengers traveling and a carrier code corresponding to the account holder and the ticket to the fraud risk model; and
   generating, by the computer system, an approval of the transaction or referral of the transaction for further identification based upon the output of the fraud risk model.

25. A method comprising:
   receiving, by a computer system for authorizing a financial transaction between a merchant and an account holder, transaction variables for a transaction;
   receiving, by the computer system, concurrently transaction variables, additional variables including a passenger name on the travel ticket, a travel date, a routing description of the travel ticket, and an electronic ticket indicator, wherein the additional variables are received as part of a real-time authorization process;
   processing, by the computer system, the passenger name on the travel ticket, a travel date, a routing description of the travel ticket, an electronic ticket indicator and transaction variables through a fraud risk model to determine a probability of fraud for the transaction; and
   transmitting, by the computer system, an approval of the transaction or referral of the transaction for further identification based upon the output of the fraud risk model.

* * * * *